United States Patent
Kim

(10) Patent No.: US 6,581,381 B2
(45) Date of Patent: Jun. 24, 2003

(54) ENGINE HAVING ADIABATIC MEMBERS IN ITS COMBUSTION CHAMBERS, ENGINE CAPABLE OF REUSING EXHAUSTED ENERGY, AND HIGH PRESSURE JET ASSEMBLY HAVING THE ENGINE

(76) Inventor: Chang Sun Kim, 358-7 Namchon-dong, Namdong-gu, Incheon-shi 405-100 (KR)

( * ) Notice: Subject to any disclaimer, the term of this patent is extended or adjusted under 35 U.S.C. 154(b) by 0 days.

(21) Appl. No.: 10/056,109

(22) Filed: Jan. 28, 2002

(65) Prior Publication Data

US 2003/0089108 A1 May 15, 2003

(30) Foreign Application Priority Data

Nov. 15, 2001 (KR) ........................................ 2001-70899

(51) Int. Cl.[7] ................................................ F02G 1/00
(52) U.S. Cl. ........................................... 60/597; 60/620
(58) Field of Search ..................................... 60/597, 620

(56) References Cited

U.S. PATENT DOCUMENTS

| | | | | |
|---|---|---|---|---|
| 3,918,263 A | * | 11/1975 | Swingle | 60/614 |
| 4,599,863 A | * | 7/1986 | Marttila | 60/616 |
| 4,796,572 A | * | 1/1989 | Heydrich | 123/193.2 |
| 4,872,432 A | * | 10/1989 | Rao et al. | 123/193.4 |
| RE34,143 E | * | 12/1992 | Rao et al. | 123/193.2 |
| 5,199,262 A | * | 4/1993 | Bell | 60/622 |
| 5,273,467 A | * | 12/1993 | Hall | 440/89 |
| 5,730,096 A | * | 3/1998 | Atmur et al. | 123/193.5 |

* cited by examiner

*Primary Examiner*—Hoang Nguyen
(74) *Attorney, Agent, or Firm*—Staas & Halsey LLP

(57) ABSTRACT

Disclosed are an adiabatic engine, an engine capable of reusing exhausted energy, and a high pressure jet assembly. The adiabatic engine has: a cylinder having an inner side surface, on which the adiabatic member is formed extending longer than at least a stroke distance; a cylinder head having a lower surface, on which the adiabatic member is formed; a suction valve and an exhaust valve respectively having a lower surface, on which the adiabatic member is formed; and a piston having an upper surface and an outer side surface, on each of which the adiabatic member is formed, the adiabatic member formed on the outer side surface of the piston has a vertical length longer than at least the stroke distance, the piston having a sealing means fitted around a circumferential outer surface of the piston under the adiabatic member on the outer side surface of the piston. In the adiabatic engine, ceramics is disposed on inner surfaces of the components defining the combustion chamber, so as to prevent heat loss in the combustion chamber as much as possible, thereby maximizing thermal efficiency. The engine utilizes pressure of the exhaust gas in increasing power of the engine. The high pressure jet assembly employs the engine as its driving engine capable of enduring high temperature.

8 Claims, 3 Drawing Sheets

ENGINE HAVING ADIABATIC MEMBERS IN ITS COMBUSTION CHAMBERS, ENGINE CAPABLE OF REUSING EXHAUSTED ENERGY, AND HIGH PRESSURE JET ASSEMBLY HAVING THE ENGINE

BACKGROUND OF THE INVENTION

1. Field of the Invention

The present invention relates to an adiabatic engine, an engine capable of reusing exhausted energy, and a high pressure jet assembly. More particularly, the present invention relates to an adiabatic engine having adiabatic members made from ceramics, which surround combustion chambers of combustion cylinders of the engine, so as to minimize heat loss in the combustion chamber and thereby maximize combustion efficiency, an engine capable of reusing, exhaust gas, which is otherwise wasted, to increase the power of the engine, and a high pressure jet assembly employing the engines as the driving engine of the jet assembly.

2. Description of the Prior Art

At recent times, developed has been a turbo compound engine which employs ceramics having a superior heat resisting characteristic as materials defining combustion chambers of a gasoline engine such as a piston and a cylinder, so as to enable the engine to be operated without being cooled. In this engine, heat loss in the combustion chambers is reduced to thereby increase the exhausted energy, and the energy in the exhaust gas of high temperature not only is utilized in driving a supercharger but also is returned to the engine so as to increase the power of the engine.

As described above, when the engine is operated without being cooled, power for driving a fan or a pump for cooling the engine is not necessary and thereby thermal efficiency of the engine is improved. However, there is a fatal disadvantage in to that individual components of the engine, especially the pistons and the cylinders, are heated to high temperature, so that lubrication of the engine is almost impossible.

Meanwhile, in the case of a general engine, the exhaust gas produced according to the operation of the engine is not reused but is mostly discharged as it is into the atmosphere, so that the energy is wasted. Moreover, the carbide or nitride contained in the exhaust gas contaminates the atmosphere, thereby causing environmental pollution.

Further, the present applicant has proposed U.S. patent application Ser. No. 09/621,282, entitled "high-speed compression propulsion system". In the system of the U.S. patent application, an inner space of an exhaust section of a driving engine is maintained in an atmosphere of high temperature by means of the wasted heat exhausted from the driving engine, so that the external air transferred at high speed from a suction port to an exhaust port is additionally expanded by the high temperature atmosphere. Thereafter, the expanded air is exhausted at high pressure through the exhaust port having a diameter smaller than that of the suction port, so that a strong propulsive power is obtained.

However, in the system of the U.S. patent application, when the driving engine is operated, the internal temperature of the system is extremely high, so that it is nearly impossible for the driving engine to endure the high temperature.

SUMMARY OF THE INVENTION

Accordingly, the present invention has been made to solve the above-mentioned problems occurring in the prior art, and an object of the present invention is to provide an adiabatic engine, in which ceramics having a superior heat resistance is disposed on an inner side surface of a cylinder, an upper surface and a cylindrical side surface of a piston, and lower surfaces of a cylinder head and valve seats, which together define a combustion chamber of the adiabatic engine, so as to prevent heat in the combustion chamber from being conducted to the exterior.

It is another object of the present invention to provide an adiabatic engine, in which ceramics is disposed on inner surfaces of the components defining a combustion chamber of the adiabatic engine, so as to prevent heat in the combustion chamber from being conducted to the exterior, thereby enabling the engine to be cooled as little as possible or by an air-cooling method.

It is another object of the present invention to provide an engine, which has an auxiliary cylinder operated by combustion gas exhausted through exhaust ports of the engine, so that the engine can reuse the wasted energy.

It is another object of the present invention to provide an adiabatic engine, in which temperature and pressure of the gas exhausted from the engine are increased and reused, so that the exhausted energy can be reused as much as possible.

It is another object of the present invention to provide an adiabatic engine, which has an additional auxiliary cylinder, so as to increase the time the combustion gas stay in the engine by twice of that in a conventional engine, thereby reducing the air pollution.

It is another object of the present invention to provide a high pressure jet assembly, which employs an adiabatic engine as a driving engine of the high pressure jet assembly, so that the driving engine can endure high temperatures, thereby improving performance of the high pressure jet assembly.

In order to accomplish this object, there is provided an adiabatic engine having at least one adiabatic member surrounding combustion chambers of the adiabatic engine, the adiabatic engine comprising: at least a cylinder having an inner side surface, on which the adiabatic member is formed extending longer than at least a stroke distance; at least a cylinder head having a lower surface, on which the adiabatic member is formed; at least a suction valve and at least an exhaust valve respectively having a lower surface, on which the adiabatic member is formed; and at least a piston having an upper surface and an outer side surface, on each of which the adiabatic member is formed, the adiabatic member formed on the outer side surface of the piston has a vertical length longer than at least the stroke distance, the piston having a sealing means fitted around a circumferential outer surface of the piston under the adiabatic member on the outer side surface of the piston.

It is preferred that the adiabatic member has a form of a layer and is made from ceramics.

It is preferred that the ceramics is formed of a ceramic sintered body, a ceramic coating layer, or a combination thereof.

The adiabatic engine may be employed in both a two-stroke cycle engine and a four-stroke cycle engine.

In the adiabatic engine, the adiabatic member provided at the inner side surface of the cylinder is a predetermined space apart from the adiabatic member provided at the outer side surface of the piston, so that, even while the piston reciprocates, the cylinder and the piston do not come into contact with each other, but the piston ring provided at the circumferential outer surface of the piston and the inner side surface of the cylinder, both of which are made from metal, are in contact with each other.

In the adiabatic engine as described above, the combustion chamber is surrounded by the adiabatic members, so that the combustion heat is not transferred to the cylinder and the piston which are in contact with each other, thereby obtaining a sufficient adiabatic effect. Therefore, there is no hindrance due to heat of high temperature in lubricating the engine even though the engine is not subjected to a separate forced cooling or a minimum cooling.

In accordance with another object of the present invention, there is provided an engine capable of reusing exhausted energy, the engine comprising: a first piston; a first cylinder in which the first piston is installed; a second piston; a second cylinder in which the second piston is installed; an auxiliary cylinder disposed adjacent to the first cylinder and the second cylinder; an auxiliary piston installed in the auxiliary cylinder; a crank shaft to which the first piston, the second piston, and the auxiliary piston are connected through connecting rods; and a cylinder head in which an exhaust port of the first cylinder and an exhaust port of the second cylinder are respectively connected with suction ports of the auxiliary cylinder, the cylinder head having suction valves and exhaust valves respectively disposed at suction ports and exhaust ports of the first cylinder, the second cylinder, and the auxiliary cylinder.

In the engine capable of reusing exhausted energy as described above, components defining the combustion chambers are provided with adiabatic members adhered to the chamber side surfaces of the components.

It is preferred that the auxiliary cylinder has a sectional area larger than each sectional area of the first and the second cylinders.

It is also preferred that the first and the second pistons are located at their top dead center when the auxiliary piston is located at its bottom dead center.

The engine may comprise at least one set of two main cylinders and one auxiliary cylinder.

In the engine, each of the exhaust valves of the first and the second cylinders may be connected with the suction valve of the auxiliary cylinder through;a common shaft.

In the engine as described above, the exhaust gas firstly burned in the first and second cylinders are alternately introduced into and expanded once again in the auxiliary cylinder, so that the energy, which is otherwise wasted, can be reused, and the combustion gas stays in the combustion chambers for twice as long as the conventional engines, so that the combustion gas can be sufficiently burned, thereby reducing exhausted pollutant. Further, since the exhaust gas is exhausted at low pressure, exhaust noise due to the exhaust gas is remarkably reduced.

In accordance with another object of the present invention, there is provided a high pressure jet assembly comprising: a housing including an operation section and an exhaust section integrated with each other, the operation section having a straight cylindrical shape, the exhaust section having a tapered cylindrical shape which has a decreasing diameter; an adiabatic engine extending along a center of the exhaust section, the adiabatic engine being supported by a supporting bracket, the adiabatic engine having adiabatic members surrounding combustion chambers of the adiabatic engine; a driving shaft of the adiabatic engine, which extends through the operation section, the driving shaft having a diameter increasing toward the exhaust section; a plurality of propellers assembled with the driving shaft, the propellers being spaced regular intervals apart; and fixed blades fixed before and after each of the propellers, the fixed blades extending in radial directions of the housing.

As described above, since the high pressure jet assembly employs the adiabatic engine as its driving engine, the driving engine of the high pressure jet assembly can endure high temperature.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings, so that those related in the art can easily carry out the present invention.

Figure 1:
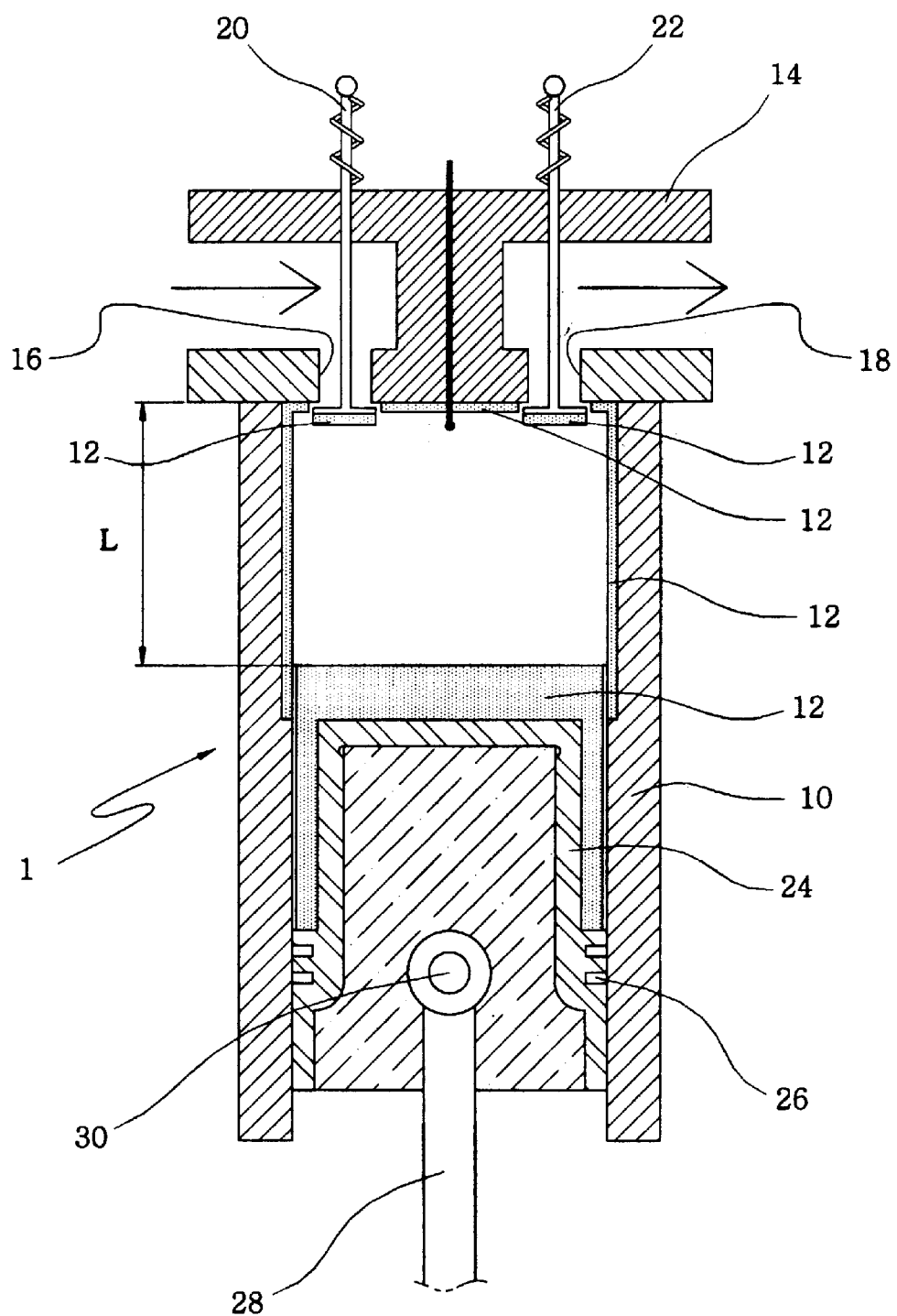
FIG. 1 is a longitudinal sectional view of a part of an engine having adiabatic members disposed around a combustion chamber of the engine according to the present invention.
Figure 2:
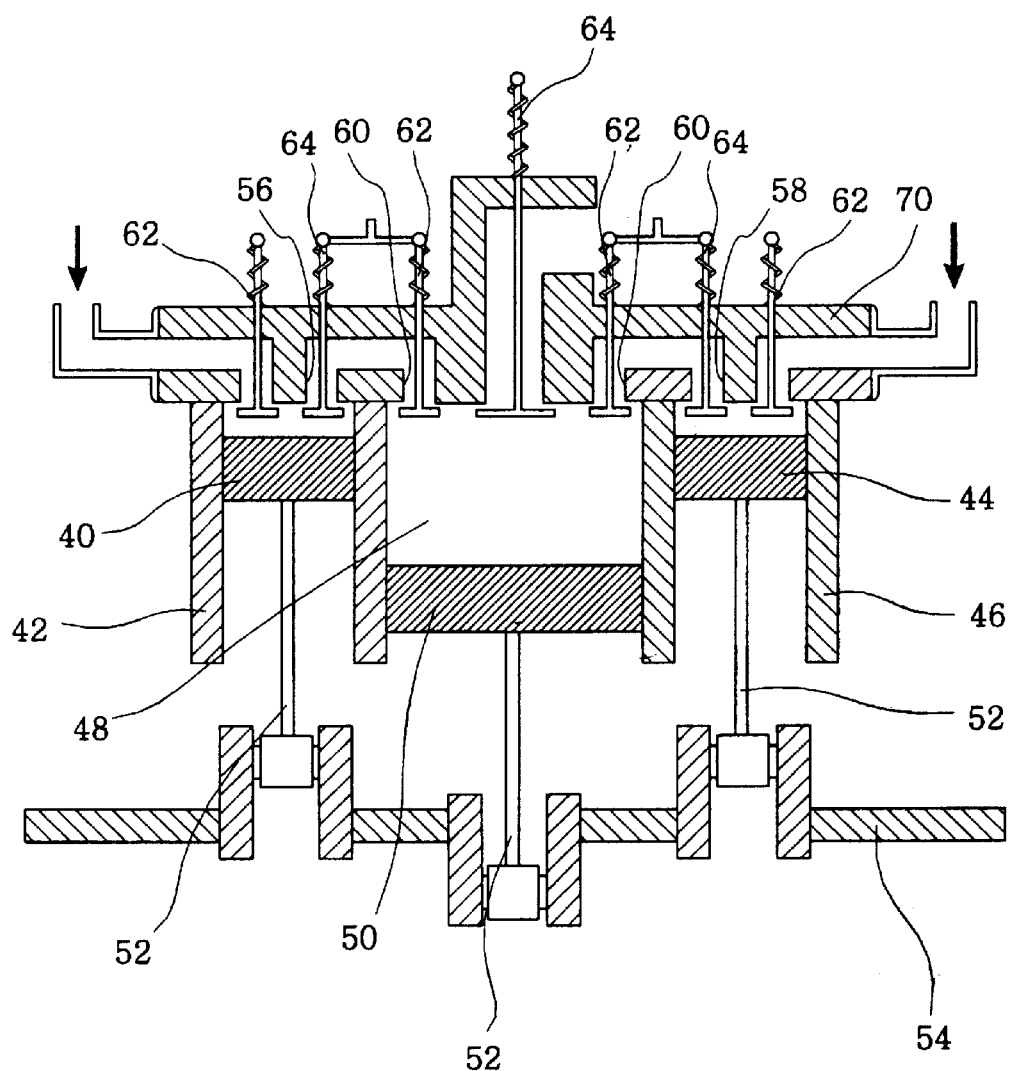
FIG. 2 is a sectional view of a part of a four-stroke cycle engine capable of utilizing exhaust gas according to the present invention.
Figure 3:
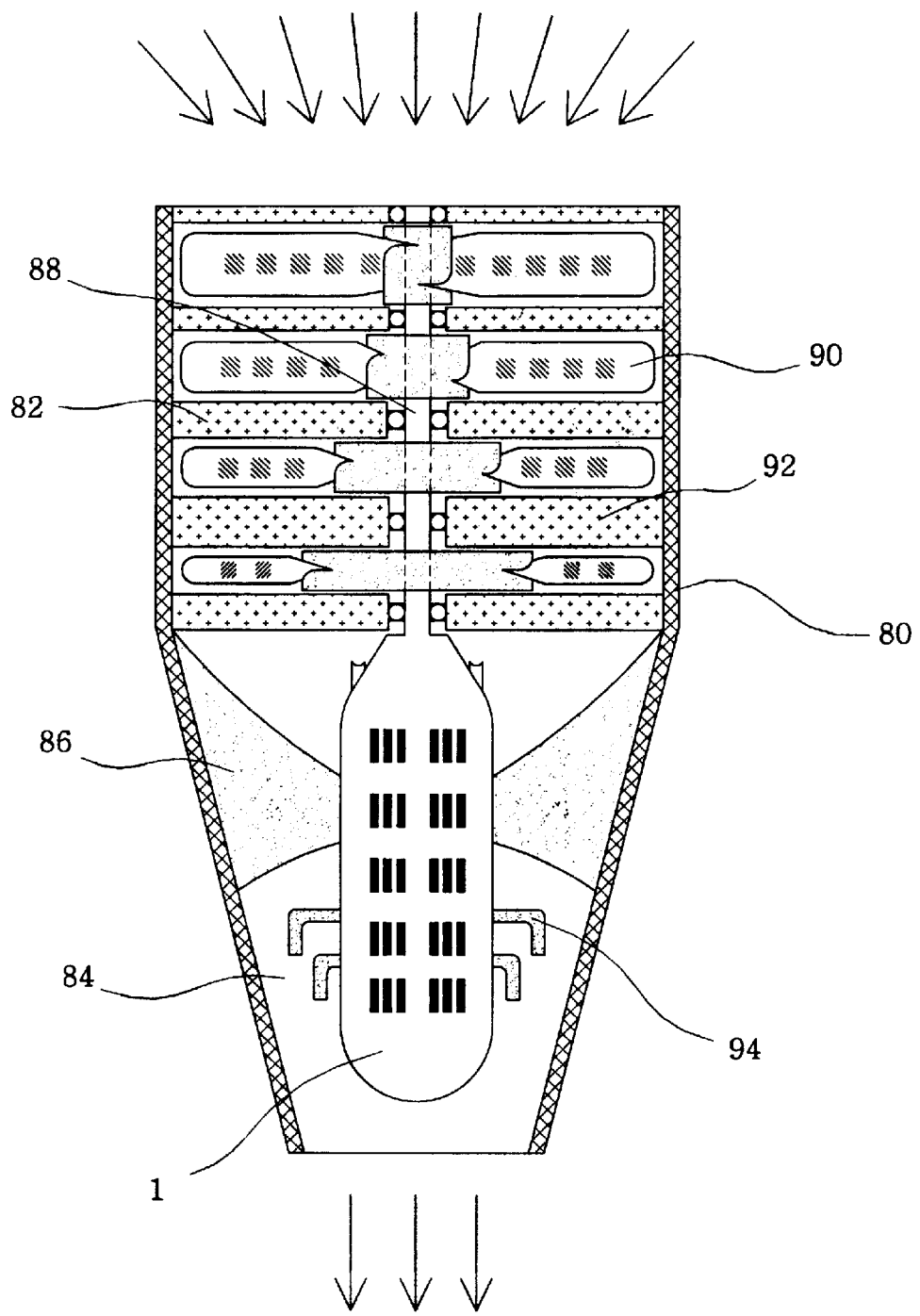
FIG. 3 is a sectional view of a high pressure jet assembly according to the present invention.

FIG. 1 is a longitudinal sectional view of a part of an engine having adiabatic members disposed around a combustion chamber of the engine according to the present invention, FIG. 2 is a sectional view of a part of a four-stroke cycle engine capable of utilizing exhaust gas according to the present invention, and FIG. 3 is a sectional view of a high pressure jet assembly according to the present invention.

Although FIG. 1 shows only one cylinder employed in the engine of the present invention, for the sake of convenience in explanation and illustration of the present invention, the engine may have two, four, six, or more cylinders and has a shape of a block of cylinders. Further, although the following description of the present invention is mainly based on a four-stroke cycle engine, the present invention may also be applied to a two-stroke cycle engine.

Referring to FIG. 1, a cylinder 10 has a hollow cylindrical shape, as in a normal engine. An adiabatic member 12 is disposed extending longer than at least the stroke distance L on an inner side surface of the cylinder 10. The adiabatic member 12 is also disposed over the entire lower surface of a cylinder head 14 disposed at the upper portion of the cylinder 10. Also, the adiabatic member 12 is disposed on lower surfaces of a suction valve 20 and an exhaust valve 22, which respectively function to open and close a suction port 16 and an exhaust port 18.

A piston 24 disposed inside of the cylinder 10 has an elongated head, and the adiabatic member 12 is disposed on an upper surface and an outer side surface of the head of the piston 24. The adiabatic member formed on the outer side surface of the head of the piston has a vertical length longer than the stroke distance L. A piston ring 26 is fitted around a circumferential outer surface of the piston 24 under the adiabatic member 12 of the piston. The piston ring 26 is a means for sealing the inner space or a combustion chamber of the cylinder while being in contact with the cylinder. A connecting rod 28 is assembled with the piston 24 by means of a pin 30.

Each of the adiabatic members 12 is in the form of a layer attached to inner and outer surfaces of components of an engine, which are made from metal.

The adiabatic members 12 are made from ceramics, and it is preferred that their thickness is properly determined according to the necessary adiabatic effect.

It is also preferred that the ceramics are formed of a ceramic sintered body, a ceramic coating layer, or a combination thereof.

An ignition plug or an injection nozzle is disposed at an upper portion of the combustion chamber. Although the engine having adiabatic members as described above may be employed in both a gasoline engine and a diesel engine, the adiabatic engine is more suitable for the diesel engine.

The adiabatic member 12 provided at the inner side surface of the cylinder 10 is set a predetermined distance apart from the adiabatic member 12 provided at the outer side surface of the piston 24, so as to form a space between the two adiabatic members 12. As a result, even while the piston 24 reciprocates, the cylinder 10 and the piston 24 do not come into contact with each other, but the piston ring 26 provided at the circumferential outer surface of the piston 24 and the inner side surface of the cylinder 10, both of which are made from metal, are in contact with each other.

As described above, the entire surface of the combustion chamber is covered with the adiabatic members, so that nearly no combustion heat is discharged to the exterior. Therefore, heat loss in the combustion chamber is prevented as much as possible, so that the thermal efficiency of the engine can be improved. Moreover, the combustion heat is not transferred to the frictional portions between the piston 24 and the cylinder 10, so that there is no problem in lubricating the frictional portions of the piston 24 and the cylinder 10, and thereby a fundamental problem of the engine made from ceramics is overcome.

FIG. 2 shows an engine capable of reusing exhausted combustion gas for the power of the engine.

The four-stroke cycle engine of the present invention as shown includes: a first piston 40; a first cylinder 42 in which the first piston 40 is installed; a second piston 44; a second cylinder 46 in which the second piston 44 is installed; an auxiliary cylinder 48 disposed adjacent to the first cylinder 42 and the second cylinder 46; an auxiliary piston 50 installed in the auxiliary cylinder 48; a crank shaft 54 to which the first piston 40, the second piston 44, and the auxiliary piston 50 are connected through connecting rods 52; and a cylinder head 70 in which an exhaust port 56 of the first cylinder 42 and an exhaust port 58 of the second cylinder 46 are respectively connected with suction ports 60 of the auxiliary cylinder 48, the cylinder head 70 having suction valves 62 and exhaust valves 64 respectively disposed at suction ports and exhaust ports of the first cylinder 42, the second cylinder 46, and the auxiliary cylinder 48.

Referring to FIG. 2, when the first cylinder 42 has nearly completed an exhaust stroke and the second cylinder 46 has nearly completed a compression stroke, the suction and exhaust valves 64 and 62 of the second cylinder 46 and the suction valve 62 of the auxiliary cylinder 48 communicating with the second cylinder 46 are closed, while the exhaust valve 64 of the first cylinder 42 and the suction valve 62 of the auxiliary cylinder 48 are open. Therefore, the exhaust gas or the combustion gas, which is exhausted out of the first cylinder 42 after being expanded in the first cylinder 42, is introduced into the auxiliary cylinder 48 and then is expanded again therein. That is, the exhaust gas from the first cylinder is reused in increasing power of the engine.

In contrast, when the first cylinder 42 performs a compression stroke and the second cylinder 46 performs an exhaust stroke, exhaust gas from the second cylinder 46 is introduced into the auxiliary cylinder 48 and then is reused for the power of the engine as described above. Further, when the first cylinder 42 has completed a suction stroke and the second cylinder 46 has completed an explosion stroke, the exhaust valve 64 of the auxiliary cylinder 48 is open, the exhausted gas, which has expanded again thereby having lowered pressure and lowered temperature, is exhausted to the exterior. Therefore, in the engine of the present invention, not only noise is reduced, but also the combustion gas is sufficiently burned while staying in the cylinders for long time, so that air pollution due to incomplete combustion is also reduced.

In the engine as described above, the first and the second cylinders 42 and 46, the auxiliary cylinder 48, the first and the second pistons 40 and 44, the auxiliary piston 50, and the suction and the exhaust valves 62 and 64 are adiabatic components, that is, surfaces of the components at the sides of the combustion chambers are covered with adiabatic members. When the adiabatic members are used, the entire surfaces of the combustion chambers are covered with the adiabatic members, so that nearly no combustion heat is discharged to the exterior. Therefore, the exhaust gas is expanded twice while heat loss in the combustion chambers is prevented as much as possible, so that the power of the engine can be increased.

As shown in FIG. 2, it is preferred that the auxiliary cylinder 48 has a sectional area larger than each sectional area of the first and the second cylinders 42 and 46. In this case, since the sectional area of the auxiliary cylinder 48 is larger than each of the sectional areas of the first and second cylinders 42 and 46, the exhaust gas, which has been once expanded in the first cylinder 42 or the second cylinder 46 and thereby have low pressure and large volume, can be sufficiently introduced into the auxiliary cylinder 48, so that a sufficient output power can be obtained.

Further, the engine of the present invention has a construction characterized in that the first and second pistons 40 and 44 are located at their top dead center when the auxiliary piston 50 is located at its bottom dead center.

Although FIG. 2 shows one set of cylinders, which includes two main cylinders and one auxiliary cylinder, cylinders may added set by set to thereby increase the entire displacement of the engine.

It is preferred that each of the exhaust valves 64 of the first and the second cylinders 42 and 46 is connected with the suction valve 62 of the auxiliary cylinder 48 through the same shaft as shown in FIG. 2.

Referring to FIG. 3, a high pressure jet assembly according to the present invention includes a housing 80 including an operation section 82 and an exhaust section 84 integrated with each other, the operation section 82 having a straight cylindrical shape, the exhaust section 84 having a tapered cylindrical shape which has a decreasing diameter; an adiabatic engine 1 extending along a center of the exhaust section 84, the adiabatic engine being supported by a supporting bracket 86; a driving shaft 88 of the adiabatic engine 1, the driving shaft 88 extending through the operation section 82; a plurality of propellers 90 assembled with the driving shaft 88, the propellers 90 being spaced at regular intervals, the propellers 90 having blades whose dimensions decrease in a direction toward the exhaust section 84; and fixed blades 92 disposed before and after each of the propellers 90, the fixed blades 92 extending in radial directions of the driving shaft 88.

It is preferred that exhaust ports 94 of the adiabatic engine 1 are oriented toward an exit of the exhaust section 84 so as to increase the pressure near the exit of the exhaust section 84 by means of exhaust gas at high temperature exhausted from the adiabatic engine 1.

In the high pressure jet assembly according to the present invention, a plurality of radial propellers 90 are fixed to the driving shaft 88 and the fixed blades 92 are disposed before and after each of the propellers 90. As a result, the fixed blades 92 prevent vortex flow from being generated in the air passing through the fixed blades 92 while the propellers 90 gradually increase the pressure, so as to allow the pressurized airflow to reach the exhaust section 84. Also, the pressure of the pressurized airflow passing through the exhaust section 84 is further increased by waste heat of the adiabatic engine 1 disposed in the exhaust section 84, and then the airflow pressurized as described above jets out through the exit at the rear end of the exhaust section after being further pressurized due to the narrowed exit.

Referring to FIG. 3, the driving engine employed in the high pressure jet assembly of the present invention is the adiabatic engine as shown in FIG. 1, which means an engine having adiabatic members surrounding combustion chambers of combustion cylinders of the engine. Therefore, the driving engine can endure the high temperature in the exhaust section 84, and the heat efficiency of the engine can be improved.

As described above, the present invention employs an adiabatic engine. Therefore, in the engine according to the present invention, most of the combustion heat is not discharged out of the combustion chamber but can be utilized to increase the power of the engine, so that the thermal efficiency of the engine can be remarkably improved.

Further, in the engine according to the present invention, the combustion heat of the engine is not conducted to the exterior of the combustion chamber. Consequently, it is not necessary to forcedly cool the engine or at least the engine may employ an air-cooling method, so that the cooling system of the engine can be simplified.

Further, the present invention employs an engine capable of reusing exhausted energy. Therefore, in the engine according to the present invention, pressure of the exhaust gas, which is otherwise wasted, can be utilized once again to increase the power of the engine, and the combustion gas stays in the combustion chambers for twice as long as the conventional engines, so that the combustion gas can be sufficiently burned. As a result, the engine of the invention has improved thermal efficiency and can reduce the air pollution due to the combustion gas. Also, the pressure of the exhaust gas is reduced, so that noise due to the exhaust gas is remarkably reduced.

Further, the present invention also discloses a high pressure jet assembly employing the adiabatic engine. Accordingly, the driving engine of the high pressure jet assembly can endure high temperatures, and thereby the exhaust gas can have a high temperature, so that the high pressure jet assembly can have an improved thermal efficiency.

Although preferred embodiment of the present invention have been described for illustrative purposes, those skilled in the art will appreciate that various modifications, additions and substitutions are possible, without departing from the scope and spirit of the invention as disclosed in the accompanying claims.

What is claimed is:

1. An adiabatic engine having an adiabatic member surrounding combustion chambers of the adiabatic engine, comprising:
   a cylinder having an inner side surface;
   a cylinder head having a lower surface;
   a suction valve and an exhaust valve respectively having a lower surface; and
   a piston having an outer side surface;
   on each of which the adiabatic member is mounted, wherein the adiabatic member provided at the upper part of the inner side surface of the cylinder is a predetermined space apart from the adiabatic member provided at the outer side surface of the piston, the adiabatic member provided at the inner surface of the cylinder and the adiabatic member provided at the outer side surface of the piston not coming into contact with each other, and the piston having a piston sealing ring fitted around a lower part on which the adiabatic member is not mounted, the piston sealing ring and the lower part of the inner side surface of the cylinder, on which the adiabatic member is not mounted, being in contact with each other.

2. An adiabatic engine as claimed in claim 1, wherein the adiabatic member has a form of a layer.

3. An adiabatic engine as claimed in claim 2, wherein the adiabatic member is made from ceramics.

4. An adiabatic engine as claimed in claim 3, wherein the ceramics is formed of a ceramic sintered body, a ceramic coating layer, or a combination thereof.

5. An adiabatic engine as claimed in claim 1, wherein the adiabatic engine may be employed in both a two-stroke cycle engine and a four-stroke cycle engine.

6. An adiabatic engine as claimed in claim 1, wherein the adiabatic member mounted on the upper part of the inner side surface of the cylinder has a length sufficient to superimpose upon the adiabatic member mounted on the outer side surface of the piston when the piston reaches bottom dead center, the adiabatic members being superimposed upon each other within a stroke distance.

7. A high pressure jet assembly, comprising:
   a housing including an operation section and an exhaust section integrated with each other, where the operation section has a straight cylindrical shape;
   an adiabatic engine extending along a center of the exhaust section, the adiabatic engine being supported by a supporting bracket, and the adiabatic engine having adiabatic members surroundings combustion chambers thereof;
   a driving shaft of the adiabatic engine, which extends through the operation section, the driving shaft having a diameter increasing toward the exhaust section;
   a plurality of propellers assembled with the driving shaft, the propellers being spaced apart at regular intervals; and
   blades fixed before and after each of the propellers, the fixed blades extending in radial directions of the housing;
   wherein the exhaust section has a tapered cylindrical shape which has a decreasing diameter toward an exit, causing a pressure of exhaust gas to increase toward the exit.

8. A high pressure jet assembly as claimed in claim 7, wherein the adiabatic engine comprises at least one set of two main cylinders and one auxiliary cylinder.

\* \* \* \* \*